United States Patent [19]

Liles

[11] Patent Number: 4,962,153

[45] Date of Patent: Oct. 9, 1990

[54] PRECURED SILICONE EMULSION

[75] Inventor: Donald T. Liles, Midland, Mich.

[73] Assignee: Dow Corning Corporation, Midland, Mich.

[21] Appl. No.: 466,542

[22] Filed: Jan. 17, 1990

Related U.S. Application Data

[63] Continuation-in-part of Ser. No. 270,600, Nov. 14, 1988, abandoned, which is a continuation-in-part of Ser. No. 130,767, Dec. 9, 1987, abandoned.

[51] Int. Cl.$^5$ ............................................. C08L 83/00
[52] U.S. Cl. .................................. 524/837; 525/478; 528/18; 528/19; 528/21; 524/588
[58] Field of Search ................. 524/837, 588; 528/18, 528/19, 21; 525/478

[56] References Cited

U.S. PATENT DOCUMENTS

| | | | |
|---|---|---|---|
| 3,294,725 | 12/1966 | Findlay et al. | 260/29.2 |
| 3,355,406 | 11/1967 | Cekada | 260/29.2 |
| 4,190,688 | 2/1980 | Traver et al. | 427/391 |
| 4,221,688 | 9/1980 | Johnson et al. | 260/29.2 M |
| 4,248,751 | 2/1981 | Willing | 260/29.2 M |
| 4,273,634 | 6/1981 | Saam et al. | 204/159.15 |
| 4,568,718 | 2/1986 | Huebnet et al. | 524/837 |
| 4,584,341 | 4/1986 | Huebner et al. | 524/837 |

Primary Examiner—Melvyn I. Marquis
Attorney, Agent, or Firm—Edward C. Elliott

[57] ABSTRACT

An aqueous silicone emulsion which dries to an elastomer comprises the product produced by homogenizing a mixture of a hydroxyl endblocked polydiorganosiloxane free of aliphatic unsaturation, silicon hydride crosslinker, surfactant and water, then emulsion polymerizing by addition of anionic polymerization catalyst to give a polymer, then, after neutralization, crosslinking the polymer by the addition of a silanol-silicon hydride condensation catalyst containing tin, zinc or Hydroxylamine.

19 Claims, No Drawings

PRECURED SILICONE EMULSION

This is a continuation-in-part of copending application Ser. No. 07/270,600 filed on Nov. 14, 1988, now abandoned, which is a continuation-in-part of copending application Ser. No. 130,767 filed Dec. 9, 1987, now abandoned.

BACKGROUND OF THE INVENTION

1. Field of the Invention

This invention relates to silicone emulsions which yield an elastomer upon removal of the water at ambient conditions

2. Background Information

Silicone emulsions which yield an elastomer upon removal of the water are known in the art. U.S. Pat. No. 3,355,406, issued Nov. 28, 1967, teaches silicone rubber latexes reinforced by adding silsesquioxane. In example 19, a composition of hydroxyl endblocked polydiorganosiloxane, silsesquioxane, methylhydrogenpolysiloxane, and dibutyltin dilaurate is taught. Upon evaporation of the water from a film of the latex, a silicone rubber film was left.

Silicone paper release coatings are taught in U.S. Pat. No. 4,190,688, issued Feb. 26, 1980. The emulsion comprises a vinyl-containing polydiorganosiloxane having hydroxyl endblocking, a hydride cross-linking agent, water, and an emulsifying agent. The composition can be cured either with a tin salt of a carboxylic acid or it can be cured with a platinum complex catalyst.

U.S. Pat. No. 4,221,688, issued Sept. 9, 1980, teaches a silicone emulsion having a dispersed phase of an anionically stabilized hydroxylated polydiorganosiloxane and a colloidal silica. In order to form a cured elastomer in a reasonable time, a tin catalyst is also present. Experience has now shown that such a system continues to cure in the emulsion and after drying, so the properties of the elastomer formed are dependent upon the age of the emulsion and the age of the dried film. The additional requirement of a pH of greater than 9 is also undesirable in many cases.

A latex of crosslinked silicone is prepared in U.S. Pat. No. 4,248,751, issued Feb. 3, 1981, by emulsifying a vinyl endblocked polydiorganosiloxane and an organosilicon compound having silicon-bonded hydrogen atoms with water and a surfactant, adding platinum catalyst, and then heating the emulsion. Colloidal silica can be added to the emulsion to provide a tougher product.

U.S. Pat. No. 4,273,634, issued June 16, 1981, teaches an emulsion comprising a continuous water phase and a dispersed phase of crosslinked silicone. The silicone phase is the product of radical produced crosslinking of hydroxyl endblocked polydiorganosiloxane which was crosslinked after it had been dispersed in water.

U.S. Pat. Nos. 4,568,718, issued Feb. 4, 1986, and 4,584,341, issued Apr. 22, 1986, teach latexes of crosslinked polydiorganosiloxane. The latex is prepared by homogenizing a mixture of hydroxyl endblocked polydiorganosiloxane, surface active anionic catalyst, and alkoxy silicon compound, then polymerizing to form a crosslinked polymer. The polymer can be reinforced by adding colloidal silica to the emulsion. An elastomer is formed when the latex is dried.

SUMMARY OF THE INVENTION

This invention relates to an aqueous silicone emulsion which dries to give an elastomer, and to methods of making such emulsions.

DESCRIPTION OF THE INVENTION

This invention is an aqueous silicone emulsion which dries to an elastomer comprising the product produced by (A) homogenizing a mixture consisting essentially of (1) 100 parts by weight of hydroxyl endblocked polydiorganosiloxane oligomer free of aliphatic unsaturation, (2) from 0.1 to 10 parts by weight of organosilicon hydride crosslinker, (3) anionic or nonionic surfactant, and (4) sufficient water to give a polydiorganosiloxane content in the mixture of from 40 to 70 percent by weight, (B) emulsion polymerizing the mixture of (A) by addition of anionic polymerization catalyst suitable to copolymerize the ingredients (1) and (2) to obtain a hydroxyl endblocked copolymer having pendant hydrogen atoms on the siloxane chain, then (C) arresting polymerization by raising the pH to a value of from about 6 to 11, then (D) crosslinking the emulsion copolymer by addition of a silanol-silicon hydride condensation catalyst, to obtain an aqueous silicone emulsion which dries to an elastomer.

The hydroxyl endblocked polydiorganosiloxane monomer can be chosen from any of such available materials, however, the material chosen should have a viscosity such that it can be easily emulsified, a fluid material is preferred such as a material having a viscosity of less than 250 cps at 25° C. The organic groups can be any of those commonly used in polydiorganosiloxanes (excluding groups containing aliphatic unsaturation) such as monovalent substituted and unsubstituted alkyl radicals with preferred radicals being methyl, ethyl, propyl, and 3, 3, 3-trifluoropropyl, and monovalent aryl radicals, such as phenyl. A preferred polymer is a hydroxyl endblocked polydimethylsiloxane having a degree of polymerization of about 35 and a viscosity of about 80 cps at 25° C. (0.08 Pa.s).

The organosilicon hydride functions as a crosslinker when it is incorporated into a polymer chain. Any organosilicon hydride that can be copolymerized with the hydroxyl endblocked polydiorganosiloxane oligomer to form an organohydrogensiloxy unit in the copolymer is satisfactory. A number of silicon hydrides are discussed in U.S. Pat. No. 4,190,688 as hydride polysiloxane crosslinking agent, said patent being incorporated by reference to show silicon hydrides and their method of manufacture. The silicon hydride crosslinker is preferably chosen from a hydrolyzable silane having hydrogen and hydrolyzable atoms or groups bonded to silicon, or from a polyorganohydrogensiloxane or from an alkylhydrogencyclosiloxane. The hydrolyzable silane should have at least one, but no more than three hydrogen atoms bonded to silicon per molecule. It should have one or two hydrolyzable atoms, such as chlorine or sulfur, or hydrolyzable radicals, such as alkoxy, bonded to silicon per molecule. A preferred silane has one hydrogen, two hydrolyzable groups, such as alkoxy, and one organic group. The silicon hydride crosslinker includes silicon hydrides such as methyldichlorosilane, and alkoxy containing hydrides such as methyldiethoxysilane. A preferred crosslinker is an organosilicon hydride such as trimethylsilyl endblocked polymethylhydrogensiloxane. Another preferred crosslinker is methylhydrogencyclosiloxane.

The amounts of the ingredients can be determined, based upon the polydiorganosiloxane (1), which is 100 parts by weight. The organosilicon hydride crosslinker normally varies from about 0.1 to 10 parts by weight, depending upon what crosslinker is used. A preferred embodiment uses from 0.5 to 2 parts by weight of methylhydrogencyclosiloxane. The preferred amount of organosilicon hydride crosslinker should give at least one mole of hydrogen on silicon for each mole of hydroxyl radical on silicon in the polydiorganosiloxane, but this is not absolutely necessary. If there is insufficient crosslinker to react with most of the hydroxyl, the resulting elastomer may be tacky on the surface and the physical properties will not be as desirable as when the amount of crosslinker is sufficient to give complete reaction with most of the hydroxyl radicals. When more than enough crosslinker is added, the excess crosslinker can condense with itself, giving domains of very high crosslink density. At some point, these high crosslink density areas lead to poorer physical properties. The optimum amount of crosslinker can be determined by experimental means with little difficulty.

The surfactant (3) can be an anionic surfactant, a nonionic surfactant, or a mixture of each. An anionic surfactant is a surface active material consisting of a hydrophobic segment joined to a hydrophillic segment. The hydrophillic segment is an anion such as a sulphate, sulfonate, or phosphate. The hydrophobic segment is a long chain linear or branched hydrocarbon radical such as octadecyl or dodecyl. The anion portion is balanced by a cation such as sodium. Surfactants useful in emulsifying silicone fluids are well known and include alkali metal sulforicinates, sulfonated glyceryl esters of fatty acids, salts of sulfonated monovalent alcohol esters, amides of amino sulfonic acid such as the sodium salt of oleyl methyl tauride, sulfonated aromatic hydrocarbon alkali salts such as sodium alpha-naphthalene monosulfonate, condensation products of naphthalene sulfonic acids with formaldehyde, and sulfates such as ammonium lauryl sulfate, triethanol amine lauryl sulfate and sodium lauryl ether sulfate. Preferred anionic surfactants are salts of the surface active sulfonic acids, as shown in U.S. Pat. No. 3,294,725, issued Dec. 27, 1966, hereby incorporated by reference to show suitable anionic surfactants, and sulfates, such as sodium dodecyl sulfate (sodium lauryl sulfate), sodium octadecyl sulfate, and sodium dodeclybenzene sulfonate.. A preferred surfactant is sodium lauryl sulfate.

Nonionic surfactants can be illustrated by saponins, condensation products of fatty acids with ethylene oxide such as dodecyl ether of tetraethylene oxide, condensation products of ethylene oxide and sorbitan trioleate, condensation products of phenolic compounds having side chains with ethylene oxide such as condensation products of ethylene oxide with isododecylphenol, and imine derivatives such as polymerized ethylene imine.

Sufficient water, preferably deionized, is added to the mixture to give a polymer content of from 40 to 70 percent by weight. The preferred polymer content is from 60 to 65 percent by weight.

The above described mixture is homogenized using any of the well-known and commercially available homogenizing machines. The preferred size of the dispersed particles is less than 0.5 micrometres with a preferred size being about 0.3 micrometres.

After homogenization, the hydroxyl endblocked polydiorganosiloxane oligomer and organosilicon hydride crosslinker in the emulsion are copolymerized by addition of an anionic polymerization catalyst. An anionic polymerization catalyst is an acid or an anionic surfactant in which the cation used to balance the charge of the anion is replaced by a hydrogen ion. Preferred polymerization catalysts are strong mineral acids such as hydrochloric acid or sulfuric acid as taught in U.S. Pat. No. 2,891,920, issued June 23, 1959 and organic acids such as surface active sulfonic acids as taught in U.S. Pat. No. 3,294,725, issued Dec. 27, 1966, both patents being incorporated by reference to show anionic polymerization catalysts and their method of manufacture. Preferred polymerization catalysts are hydrochloric acid, hydrogen lauryl sulfate, and dodecylbenzenesulfonic acid. A preferred method adds sufficient alkylbenzene sulfonic acid, such as dodecylbenzenesulfonic acid, to give a pH of 1 to 2. Polymerization will take place at room temperature. After about 24 hours at room temperature, the copolymer produced by the polymerization of the hydroxyl endblocked polydiorganosiloxane and the organosilicon hydride crosslinker will reach optimum molecular weight. It is preferred that the polymer have a weight average molecular weight of from 50,000 to 500,000 with a value of about 250,000 most preferred. The copolymer has hydroxyl groups on the ends and organohydrogensiloxy units dispersed along the copolymer chain.

If a polymerization catalyst is used as the anionic surfactant in step (A), then the homogenization step of (A) and the polymerization step (B) are both taking place at the same time. There would be some polymerization taking place during the homogenization step, but it would not be sufficient to cause a problem with the equipment. The homogenized emulsion would then be placed in a container and the polymerization allowed to proceed until the desired molecular weight had been achieved, at which point the pH is raised to stop the polymerization. The surfactant (3) and the polymerization catalyst of step B can be the same material, as when the material is a surface active sulfonic acid such as dodecylbenzene sulfonic acid.

Polymerization is arrested by raising the pH to a value of from about 6 to 11, with a preferred range of from about 6 to 7.5. When the pH is above about 7.5, the hydrogen on silicon in the silicon hydride crosslinker is prone to hydrolysis, with the formation of a silanol and hydrogen. In certain cases the resulting material will still function since the resulting condensation between hydroxyl groups on the polydiorganosiloxane and on the crosslinker is catalyzed by dialkyltindicarboxylate. Stannous compounds, however, will not catalyze silanol condensation, so if the SiH is prehydrolyzed (high pH) before addition of a stannous catalyst, the material will not crosslink and an elastomer will not form. Suitable additives for raising the pH include dilute bases such as alkali metal hydroxides and organic amines. The additives for raising the pH should be diluted with water to avoid any possibility of breaking the emulsion when they are added. A preferred additive is 20 percent aqueous diethylamine.

The emulsified copolymer is then crosslinked by adding to the emulsion a silanol-silicon hydride condensation catalyst. The hydroxyl ends on one copolymer molecule react with the hydrogen-on-silicon found along the copolymer chain of another molecule, thus providing a crosslink. Preferred silanol-silicone hydride condensation catalysts include organometallic compounds, metallic salts, and hydroxylamines. Numerous organometallic compounds and metallic salts are known to catalyze this reaction. Preferred are those salts based upon tin or zinc. A preferred catalyst is dialkyltindicarboxylate, such as dioctyltindilaurate. The stannous form of tin is also catalytic in the invention. A preferred catalyst is a stannous salt such as stannous octoate. The quantity of catalyst used depends upon the time allowed for crosslinking before removal of the water to give an elastomer. For example, one part dioctyltindilaurate per hundred parts of copolymer will essentially completely crosslink in about 3 days at room temperature. Crosslinking was still proceeding after two weeks when 0.1 part of this catalyst was used. The crosslinking rate can be accelerated by raising the temperature, for instance to 70° C. Hydrogen is given off during crosslinking. This evolution of hydrogen gives a convenient method of determining when crosslinking is complete. A preferred amount of dialkyltindicarboxylate is from 0.1 to 1 part per hundred parts of polymer. A preferred amount of dioctyltindilaurate is about 0.2 part by weight per 100 parts by weight of polydiorganosiloxane.

Another catalyst that causes SiOH to react with SiH is hydroxylamine. An SiH functional siloxane reacts with hydroxylamine to produce O-aminoxy functional siloxane plus hydrogen. The hydroxyl group on silicon readily reacts with O-aminoxyfunctionl siloxane, producing a siloxane bond and regenerating hydroxylamine. The process repeats itself until SiH is exhausted. Since the SiH is a pendent group along the siloxane chain, the new siloxane bond formed via hydroxylamine acts as a crosslink site. The net result is a crosslinked emulsion polymer which dries to form an elastomer. Suitable examples of hydroxylamine include hydroxylamine and N,N-dialkylhydroxylamines such as N,N-diethylhydroxylamine. A preferred hydroxylamine catalyst is N,N-diethylhydroxylamine.

The amount of hydroxylamine catalyst used determines the rate of the crosslinking reaction. If too little is used, the rate becomes unduly long, while too much hydroxylamine catalyst may lower the mechanical properties of the resulting elastomer. The preferred amount of N,N-diethylhydroxylamine catalyst is 0.5 to 1.5 parts by weight per 100 parts by weight of the copolymer. The hydroxylamine catalyst is added to the emulsion after the copolymerization and neutralization step.

Since the emulsion crosslinks through the silanol-silicon hydride reaction, there is no need for the silica required in an emulsion such as that taught by Johnson et al. in U.S. Pat. No. 4,221,688. In that case, a reaction between the hydroxylated polydiorganosiloxane and the silica provides the crosslinking necessary to give an emulsion which gives an elastomeric product upon removal of the water.

After all of the ingredients are added, the emulsion is ready for use. When the emulsion is going to be stored before use or packaged in sealed containers, it is desirable to allow the crosslinking to be completed before placing the emulsion in sealed containers, since hydrogen is given off during crosslinking and can build up pressure and a possible fire hazard if it is not allowed to escape from the emulsion as it is formed. When the emulsion is applied to a surface and allowed to dry, an elastomer results. This can be left as a protective coating, or can be removed to give an elastomeric film.

The elastomer is rather weak without reinforcement. The elastomer can be reinforced by adding a reinforcing filler to the emulsion. The elastomer produced by this process can be filled with any of the well known reinforcing or non-reinforcing fillers useful with silicone elastomers as long as the filler is chosen so that it does not effect the pH of the emulsion so that it goes out of the required range of from about 6 to 11. Common reinforcing fillers include fumed silica, colloidal silica dispersions, fumed titanium dioxide, and colloidal titanium dioxide dispersions. Non-reinforcing fillers include ground quartz, calcium carbonate, non-acidic carbon black, clays, aluminum oxide, zinc oxide, mica, and various coloring pigments. These fillers should be finely divided and it may be advantageous to add them as aqueous dispersions. The amount of filler added is not critical, it is chosen to give the desired effect, such as increased tensile strength, or increased hardness or increased modulus for the resulting elastomer. A preferred reinforcing filler is an aqueous, dispersed, fumed silica. A preferred non-reinforcing filler is calcium carbonate. The preferred amount of silica is from 1 to 50 parts by weight of silica per 100 parts by weight of polymer.

The following examples are included for illustrative purposes only and should not be construed as limiting the invention, which is properly set forth in the appended claims.

EXAMPLE 1

A mixture was prepared of 381.2 g of hydroxyl endblocked polydimethylsiloxane fluid having a degree of polymerization of about 35, 3.85 g of trimethylsiloxy endblocked polymethylhydrogensiloxane having a viscosity of about 0.13 Pa.s at 25° C. and a silicon-bonded hydrogen atom content of about 1.6 percent by weight, 15.9 g of a 30 percent solution of sodium lauryl sulfate, and 186 g of distilled water. The mixture was homogenized by running through a laboratory single stage homogenizer two times, giving a uniform emulsion having an average particle size of about 0.32 micrometres. The emulsion was polymerized by adding 3.2 g of dodecylbenzenesulfonic acid and allowing to stand at about 25° C. for 24 hours. The polymerization was terminated by adding sufficient diethylamine to raise the pH to between 7 and 7.5. Next 30 g of the emulsion were catalyzed by adding 0.372 g of a 50 percent solids aqueous emulsion of dioctyltindilaurate (1 part tin catalyst per 100 parts copolymer). The vial was shaken to mix and allowed to stand at 25° C. for 3 days. A small quantity of the crosslinked emulsion was poured into a Petri dish to give a film and allowed to dry in air for 5 days. A silicone elastomeric film resulted.

A mixture was prepared of 10 g of the above crosslinked emulsion and 2.21 g of a 28 percent solids dispersion of fumed silica in water (Cabosperse SC-4). This was equivalent to 10 parts of silica per 100 parts of copolymer. After thorough mixing, 5 g of the reinforced emulsion was poured into a Petri dish and allowed to dry for 7 days at room temperature. The resulting film was removed from the dish and tested for physical properties, with the results shown in Table 1.

Similar reinforced emulsions were prepared, varying the amount of silica added as shown in Table 1. The resulting films were tested with the results shown in Table 1.

TABLE 1

| Fumed Silica parts | Tensile Strength MPa | Elongation percent |
|---|---|---|
| 0 | <0.3 | — |

TABLE 1-continued

| Fumed Silica parts | Tensile Strength MPa | Elongation percent |
| --- | --- | --- |
| 10 | 1.03 | 300 |
| 20 | 1.72 | 350 |
| 30 | 2.07 | 160 |
| 40 | crazed upon drying | |

EXAMPLE 2

A series of emulsion copolymers was made following the procedure of Example 1. Different amounts of crosslinker were used as shown in Table II. The crosslinker was a mixture of methylhydrogencyclotetrasiloxane and methylhydrogencyclopentasiloxane. After catalyzing with 1 part of dioctyltindilaurate and aging for 4 days, the emulsions were reinforced with various amounts of the dispersed fume silica dispersion of Example 1 as shown in Table II. The emulsions were then cast into films and allowed to air dry for 7 days, after which they were tested for physical properties with the results shown in Table II.

TABLE II

| Crosslinker parts | Silica parts | Tensile Strength MPa | Elongation percent |
| --- | --- | --- | --- |
| 1 | 10 | 0.93 | 400 |
| 1 | 20 | 1.72 | 350 |
| 1 | 30 | 2.41 | 300 |
| 2 | 10 | 1.38 | 270 |
| 2 | 20 | 2.23 | 200 |
| 2 | 30 | 2.93 | 200 |
| 3 | 10 | 1.10 | 120 |
| 3 | 20 | 3.10 | 170 |
| 3 | 30 | 2.58 | 100 |

EXAMPLE 3

First, 7.27 g of methyldiethoxysilane was added to 641.6 g of hydroxyl endblocked polydimethylsiloxane having a viscosity of about 0.08 Pa.s and the mixture was stirred several minutes until it became homogeneous. Then 26.5 g of a 30 percent aqueous solution of sodium lauryl sulfate and 309.8 g of distilled and deionized water were added and the mixture was stirred 30 minutes. This mixture was homogenized using a laboratory homogenizer at 7500 psi for 2 passes. The emulsion was polymerized by adding enough dodecylbenzene sulfonic acid with stirring to lower pH of the emulsion to 2. Polymerization was allowed to proceed for 20 hrs at room temperature after which it was terminated by raising the pH of the emulsion to 6.5 to 7.0. trimethylsiloxy endblocked polymethylhydrogensiloxane having a viscosity of about 0.13 Pa.s at 25° C. and a silicon-bonded hydrogen atom content of about 1.6 percent by weight and the mixture was stirred for several minutes until a solution resulted. Then 25 g of a 30 percent aqueous solution of sodium laurylsulfate (WAQE) and 309.8 g of deionized water were added and the mixture was stirred for 30 minutes. Next the mixture was homogenized using a Gaulin laboratory single stage homogenizer at 7500 psi (for two passes) to produce an emulsion having an average particle size of 0.3 micrometer and a solids content of about 65 perent by weight. The emulsion was polymerized by adding 6 g of 4N hydrochloric acid and stirring the emulsion for several minutes. The emulsion was allowed to stand at room temperature for 17 hours in a closed container after which the emulsion was neutralized by adding sufficient 2 percent aqueous sodium hydroxide solution to raise the pH to 6.5 to 7.5. This emulsion consisted of a polydimethylsiloxane/0.5 weight percent methylhydrogensiloxane copolymer having a solids content of about 62 percent by weight.

To a 15 g aliquot of the above prepared emulsion in a small vial was added 0.1 g of stannous octoate and the emuslion was mixed thoroughly by shaking the vial (mechanical shaker) for 15 minutes. The emulsion was allowed to remain undisturbed for 20 hours after which a film of the emulsion was cast by pouring 10 grams of the emulsion into a 100 mm diameter plastic Petri dish. After the film was allowed to dry at ambient conditions for 20 hours, it was examined and found to be only slightly

EXAMPLE 4

To 645.6 g of the hydroxyl endblocked polydimethylsiloxane fluid of Example 1 was added 3.24 g of trimethylsiloxy endblocked polymethylhydrogensiloxane having a viscosity of about 0.13 Pa.s at 25° C. and a silicon-bonded hydrogen atom content of about 1.6 percent by weight and the mixture was stirred for several minutes until a solution resulted. Then 25 g of a 30 percent aqueous solution of sodium laurylsulfate (WAQE) and 309.8 g of deionized water were added and the mixture was stirred for 30 minutes. Next the mixture was homogenized using a Gaulin laboratory single stage homogenizer at 7500 psi (for two passes) to produce an emulsion having an average particle size of 0.3 micrometer and a solids content of about 65 perent by weight. The emulsion was polymerized by adding 6 g of 4N hydrochloric acid and stirring the emulsion for several minutes. The emulsion was allowed to stand at room temperature for 17 hours in a closed container after which the emulsion was neutralized by adding sufficient 2 percent aqueous sodium hydroxide solution to raise the pH to 6.5 to 7.5. This emulsion consisted of a polydimethylsiloxane/0.5 weight percent methylhydrogensiloxane copolymer having a solids content of about 62 percent by weight.

To a 15 g aliquot of the above prepared emulsion in a small vial was added 0.1 g of stannous octoate and the emuslion was mixed thoroughly by shaking the vial (mechanical shaker) for 15 minutes. The emulsion was allowed to remain undisturbed for 20 hours after which a film of the emulsion was cast by pouring 10 grams of the emulsion into a 100 mm diameter plastic Petri dish. After the film was allowed to dry at ambient conditions for 20 hours, it was examined and found to be only slightly elastomeric. Another 15 g aliquot of emulsion was catalyzed with 0.1 g stannous octoate using the same procedure as described above. After mixing, the emulsion was heated in the closed vial at 60° C. Films were cast from this emulsion after it was heated for 8, 24 and 28 hours. The dried film that was heated the longest was elastomeric and only slightly tacky, indicating that it was cross-linked to a moderate extent.

A film from the above emulsion, but not catalyzed with stannous octoate, was also cast and it was found to be non-elastomeric.

EXAMPLE 5

To a 20 g aliquot of the emulsion from example 4 was added 0.24 g of N,N-diethylhydroxylamine. The vial was capped and it was shaken for 20 minutes. The emulsion was allowed to remain undisturbed for 20 hours in the closed vial after which it was poured into a 100 mm dia plastic Petri dish. One day later, the film was inspected and it was found to be tack-free and elastomeric.

That which is claimed is:

1. An aqueous silicone emulsion which dries to an elastomer comprising the product produced by
   (A) homogenizing a mixture consisting essentially of
      (1) 100 parts by weight of hydroxyl endblocked polydiorganosiloxane oligomer free of aliphatic unsaturation,
      (2) from 0.1 to 10 parts by weight of organosilicon hydride crosslinker,
      (3) anionic or nonionic surfactant, and
      (4) sufficient water to give a polydiorganosiloxane content in the mixture of from 40 to 70 percent by weight, (B) emulsion polymerizing the mixture of (A) by addition of anionic polymerization catalyst suitable to copolymerize the ingredients (1) and (2) to obtain a hydroxyl endblocked copolymer having pendant hydrogen atoms on the siloxane chain, then
   (C) arresting polymerization by raising the pH to a value of from about 6 to 11, then
   (D) crosslinking the emulsion copolymer by addition of a silanol-silicon hydride condensation catalyst, to obtain an aqueous silicone emulsion which dries to an elastomer.

2. The aqueous silicone emulsion of claim 1 in which the organosilicon hydride crosslinker (2) is selected from the group consisting of hydrolyzable silane having hydrogen and hydrolyzable atoms or groups bonded to silicon, alkylhydrogencyclosiloxane, and polyorganohydrogensiloxane.

3. The aqueous silicone emulsion of claim 1 in which the anionic polymerization catalyst is chosen from the group consisting of strong mineral acids and surface active sulfonic acids.

4. The aqueous silicone emulsion of claim 1 in which the pH is from 6 to 7.5.

5. The aqueous silicone emulsion of claim 1 to which a filler has been added.

6. The aqueous silicone emulsion of claim 1 in which the silanol-silicon hydride condensation catalyst is selected from the group consisting of tin salts, zinc salts, and hydroxylamines.

7. The aqueous silicone emulsion of claim 5 in which the organosilicon hydride crosslinker contains hydrolyzable atoms or groups bonded to silicon.

8. The aqueous silicone emulsion of claim 5 in which the organosilicon hydride crosslinker is an alkylhydrogencyclosiloxane.

9. The aqueous silicone emulsion of claim 5 in which the organosilicon hydride crosslinker is polymethylhydrogensiloxane fluid.

10. The aqueous silicone emulsion of claim 7 in which the condensation catalyst is a dialkyltindicarboxylate present in an amount of from 0.2 to 1 part by weight.

11. The aqueous silicone emulsion of claim 7 in which the condensation catalyst is a stannous salt.

12. The aqueous silicone emulsion of claim 7 in which the condensation catalyst is a hydroxylamine.

13. The aqueous silicone emulsion of claim 8 in which the alkylhydrogencyclosiloxane is present in an amount of from 0.5 to 2 parts by weight and the condensation catalyst is a dialkyltindicarboxylate present in an amount of from 0.1 to 1 part by weight.

14. The aqueous silicone emulsion of claim 9 in which the condensation catalyst is a dialkyltindicarboxylate present in an amount of from 0.1 to 1 part by weight.

15. The aqueous silicone emulsion of claim 9 in which the condensation catalyst is a stannous salt present in an amount of from 0.1 to 1 part by weight.

16. The aqueous silicone emulsion of claim 9 in which the condensation catalyst is a hydroxylamine present in an amount of from 0.5 to 1.5 parts by weight.

17. An aqueous silicone emulsion which dries to an elastomer comprising the product produced by
   (A) homogenizing a mixture consisting essentially of
      (1) 100 parts by weight of hydroxyl endblocked polydiorganosiloxane oligomer free of aliphatic unsaturation,
      (2) from 0.1 to 10 parts by weight of organosilicon hydride crosslinker,
      (3) surface active sulfonic acid surfactant, and
      (4) sufficient water to give a polydiorganosiloxane content in the mixture of from 40 to 70 percent by weight,
   (B) emulsion polymerizing the mixture of (A) by allowing copolymerization of the ingredients (1) and (2) to obtain a hydroxyl endblocked copolymer having pendant hydrogen atoms on the siloxane chain, then
   (C) arresting polymerization by raising the pH to a value of from about 6 to 11, then
   (D) crosslinking the emulsion copolymer by addition of a silanol-silicon hydride condensation catalyst, to obtain an aqueous silicone emulsion which dries to an elastomer.

18. An aqueous silicone emulsion which dries to an elastomer consisting essentially of the product produced by
   (A) homogenizing a mixture consisting essentially of
      (1) 100 parts by weight of hydroxyl endblocked polydiorganosiloxane oligomer free of aliphatic unsaturation,
      (2) from 0.1 to 10 parts by weight of organosilicon hydride crosslinker,
      (3) anionic or nonionic surfactant, and
      (4) sufficient water to give a polydiorganosiloxane content in the mixture of from 40 to 70 percent by weight,
   (B) emulsion polymerizing the mixture of (A) by addition of anionic polymerization catalyst suitable to copolymerize the ingredients (1) and (2) to obtain a hydroxyl endblocked copolymer having pendant hydrogen atoms on the siloxane chain, then
   (C) arresting polymerization by raising the pH to a value of from about 6 to 11, then
   (D) crosslinking the emulsion copolymer by addition of a silanol-silicon hydride condensation catalyst, to obtain an aqueous silicone emulsion which dries to an elastomer.

19. An aqueous silicone emulsion which dries to an elastomer consisting essentially of the product produced by
   (A) homogenizing a mixture consisting essentially of
      (1) 100 parts by weight of hydroxyl endblocked polydiorganosiloxane oligomer free of aliphatic unsaturation,
      (2) from 0.1 to 10 parts by weight of organosilicon hydride crosslinker,
      (3) surface active sulfonic acid surfactant, and (4) sufficient water to give a polydiorganosiloxane content in the mixture of from 40 to 70 percent by weight, (B) emulsion polymerizing the mixture of (A) by allowing copolymerization of the ingredients (1) and (2) to obtain a hydroxyl endblocked copolymer having pendant hydrogen atoms on the siloxane chain, then (C) arresting polymerization by raising the pH to a value of from about 6 to 11, then (D) crosslinking the emulsion copolymer by addition of a silanol-silicon hydride condensation catalyst, to obtain an aqueous silicone emulsion which dries to an elastomer.

* * * * *